United States Patent [19]

Narumiya

[11] Patent Number: 5,145,261
[45] Date of Patent: Sep. 8, 1992

[54] LINEAR GUIDE DEVICE
[75] Inventor: Hisayoshi Narumiya, Kobe, Japan
[73] Assignee: Koyo Seiko Co., Ltd., Osaka, Japan
[21] Appl. No.: 744,101
[22] Filed: Aug. 13, 1991
[30] Foreign Application Priority Data Aug. 14, 1990 [JP] Japan ............................ 2-215264
Aug. 14, 1990 [JP] Japan ............................ 2-215266

[51] Int. Cl.$^5$ ............................................ F16C 29/06
[52] U.S. Cl. ................................................ 384/45
[58] Field of Search ........................ 384/45, 43, 44; 464/168

[56]  References Cited
U.S. PATENT DOCUMENTS

| 4,983,049 | 1/1991 | Lecomte | 384/45 |
| 5,013,164 | 7/1991 | Tsukada | 384/45 |
| 5,033,870 | 7/1991 | Neubauer | 384/45 |
| 5,059,037 | 10/1991 | Albert | 384/45 |

Primary Examiner—Lenard A. Footland
Attorney, Agent, or Firm—Mason, Fenwick & Lawrence

[57] ABSTRACT

A linear guide device comprising a straight guide rail, and a movable body having an approximately inverted U-shaped cross section and movable as fitted over the guide rail. A line through the center of curvature of the circular-arc portion of the movable body ball guide groove to be in point contact with the ball in the load reducing region is shifted, when seen in cross section, on a line extending from said line and extending through a point away from a straight line through the points of contact of the ball with the circular-arc portions of the ball guide grooves in a maximum loading region, within a range closer to the guide rail than a line through the center of curvature of the circular-arc portion of the guide rail ball guide groove to be in point contact with the ball, and is thereby made to gradually approach the line of the guide rail through the center toward the reverse passage.

6 Claims, 9 Drawing Sheets

LINEAR GUIDE DEVICE

BACKGROUND OF THE INVENTION

The present invention relates to linear guide devices, for example, for use in linearly moving the table of a machining tool, and more particularly to a linear guide device comprising a straight guide rail and a movable body approximately inverted U-shaped in cross section and movable as fitted over the guide rail.

The terms "front," "rear," "left" and "right" are used herein and in the appended claims with respect to the direction of movement of the movable body.

Linear guide devices of the above-mentioned type heretofore known include one which comprises a straight guide rail, and a movable body having an approximately inverted U-shaped cross section and movable as fitted over the guide rail. Each of opposite side surfaces of the guide rail and the surface of each of opposite legs of the movable body which surface is opposed to the rail side surface are each formed with a ball guide groove having a circular-arc portion. The ball guide grooves are equal in the curvature of the circular-arc portion over the entire length thereof and provide a forward ball passage. Each of opposite legs of the movable body is formed with a return ball passage. Each end of the forward ball passage is in communication with the corresponding end of the return ball passage through a reverse passage formed in each end of the movable body to form a circular ball channel. A plurality of balls are enclosed in the circulation ball channel, rollable between the movable body and the guide rail, and in point contact with the circular-arc portions of the ball guide grooves when in the forward ball passage of the circulation channel. A line through the center of curvature of the movable body ball guide groove is in parallel to a line through the center of curvature of the guide rail ball guide groove.

With the known device described above, the balls are rolalble in point contact with the circular-arc portions of the two grooves, so that the line through the center of curvature of the movable body guide groove is naturally positioned closer to the guide rail than the line through the center of curvature of the guide rail guide groove. Further when in the forward ball passage, the ball is preloaded in a direction through the points of contact of the ball with the ball guide faces.

With the linear guide device described, the forward ball passage is a loading zone, and the return ball passage and the reverse ball passage are nonloading zones. In the loading zone wherein the ball is loaded, the ball is elastically brought close to the circular-arc portions of the grooves and elastically deformed by contact with these portions. In the nonloading zone, there is a clearance inside the groove circular-arc portions around the ball for the ball to freely roll along, and the ball is free of deformation. Accordingly, the ball is abruptly relieved of the load acting thereon when entering the nonloading zone from the loading zone, whereas the ball is abruptly loaded heavily when entering the loading zone from the nonloading zone. In either case, the ball deforms suddenly. Consequently, when the balls travel between the loading zone and the nonloading zone even under a constant load, the movable body will not advance straight properly because the number of loaded balls changes abruptly, entailing the problem of causing vibration to the movable body.

To gradually decrease the load on the ball as the ball rolls along toward the reverse passage, therefore, a load reducing region is conventionally formed at each of longitudinally opposite ends of the ball guide groove of the movable body, for example, by grinding the end portion of the guide groove after the groove has been formed by grinding the movable body. In the load reducing region, the line through the center of the movable body ball guide groove is deviated, when seen in cross section, on a straight line extending from the above line through the points of contact of the ball with the circular-arc portions of the ball guide grooves in a maximum loading region, and is thereby gradually brought closer to the line through the center of the guide rail ball guide groove toward the reverse passage.

When in the forward passage, the balls are then all preloaded only in the direction through the points of contact of the ball with the two ball guide grooves, i.e., in the same direction. This gives rise to problems. If the balls are loaded in a direction other than the preloading direction, especially in a direction orthogonal to the line through the points of contact, a reduced loading capacity or rigidity will result, and the movable body undergoes greater vibration.

SUMMARY OF THE INVENTION

The main object of the present invention is to provide a linear guide device free of the foregoing problems.

Other objects of the invention will become apparent from the following description.

To fulfill the above objects, the present invention provides a linear guide device comprising a straight guide rail, and a movable body having an approximately inverted U-shaped cross section and movable as fitted over the guide rail, each of opposite side surfaces of the guide rail and a surface of each of opposite legs of the movable body which surface is opposed to the rail side surface being each formed with a ball guide groove having a circular-arc portion, the ball guide grooves being equal in the curvature of the circular-arc portion over the entire length thereof, the ball guide grooves providing a forward ball passage, each of opposite legs of the movable body being formed with a return ball passage, each end of the forward ball passage being in communication with the corresponding end of the return ball passage through a reverse passage fromed in each end of the movable body to form a circulation ball channel, a plurality of balls being enclosed in the circulation ball channel and rollable between the movable body and the guide rail, the balls being in point contact with the circular-arc portions of the ball guide grooves when in the forward ball passage of the circulation ball channel, the ball guide groove of the movable body having at each end thereof a load reducing region gradually decreasing the load on the ball toward the reverse passage, a line through the center of curvature of the circular-arc portion of the movable body ball guide groove to be in point contact with the ball in the load reducing region being shifted, when seen in cross section, on a line extending from said line and extending through a point away from a straight line through the points of contact of the ball with the circular-arc portions of the ball guide grooves in a maximum loading region, within a range closer to the guide rail than a line through the center of curvature of the circular-arc portion of the guide rail ball guide groove to be in point contact with the ball, and being thereby made to gradually approach the line of the guide rail through the center toward the reverse passage.

With the linear guide device of the present invention, the line through the center of the movable body guide groove in the load reducing region is displaced, when seen in cross section, on the line extending from this line through a point away from the straight line through the contact points in the maximum loading region and is thereby made to gradually approach the line through the center of guide rail guide groove toward the reverse passage. In the load reducing region, therefore, the distance between the points of contact of the ball with the guide groove portions gradually increases toward the reverse passage, consequently reducing the load on the ball gradually, whereby the movable body is prevented from displacement when the balls travel between the loading zone and the nonloading zone. In the load reducing region, moreover, the points of contact of the ball with the groove circular-arc portions of the guide rail and the movable body gradually shift when seen in cross section, and the direction through the points of contact gradually alters, so that the ball is preloaded in varying directions. This inhibits the vibration that would occur when the balls are loaded in a direction other than the direction of the straight line in the maximum loading region through the points of contact of the ball with the two guide groove circular-arc portions.

When the line through the above-mentioned center of the movable body shifts, when seen in cross section, toward a line extending through the line through the above-mentioned center of the guide rail guide groove and in the direction of the reverse passage, the ball in the forward passage is preloaded in a direction toward the reverse passage immediately before entering the reverse passage and is therefore smoothly movable into the reverse passage. Conversely when moving from the reverse passage into the forward passage, the ball is also easily movable into the forward passage.

According to a preferred embodiment of the invention, the circulation ball channel is provided at each of upper and lower two levels on each of the right and left sides of the guide rail. The line through the points of contact of the ball with the guide groove circular-arc portions forming the forward ball passage of one of the circulation channels intersects the corresponding line of the other circulation channel laterally outwardly of the forward passages of the channels. The lines through the centers of curvature of the two movable body ball guide grooves in the load reducing regions shift in directions toward each other. This structure prevents the ball from causing damage to a thin wall part of a ball scooping portion forming the reverse passage of the movable body and formed in the vicinity of the junction of the reverse passage and the forward passage.

Conversely, the line through the points of contact of the ball with the guide groove circular-arc portions forming the forward ball passage of one of the circulation channels at each side of the guide rail intersects the corresponding line of the other circulation channel laterally inwardly of the forward passages. The lines through the centers of curvature of the two movable body ball guide grooves in the load reducing regions shift in directions away from each other. The same effect as described above is also available in this case.

When the line through the above-mentioned center of the movable body is most remote from the line through the above-mentioned center of the guide rail in the lengthwise middle portion of the movable body and approaches the latter line toward lengthwise opposite ends of the movable body, the distance between the points of contact of the ball with the two guide groove circular-arc portions is smallest at the middle portion and gradually increases toward the lengthwise opposite ends of the movable body. Accordingly the clearance around the ball is smallest in the lengthwise middle portion of the forward passage and gradually increases toward the lengthwise opposite ends of the forward passage. When the movable body is installed, for example, on the table of machining tool, it is likely that the installation involves errors, such that the movable body is installed as rotated about a vertical axis or a lateral horizontal axis, or the surface to which the body is installed will invovle minute geometrical errors. The movable body will then be subjected to a moment (so-called yawing moment) about the vertical axis, i.e., an axis orthogonal to the direction of advance of the movable body, or to a moment (so-called pitching moment) about the lateral horizontal axis. Even in such a case, the above feature prevents the balls from being excessively loaded at the ends of the ball guide grooves of the movable body, assuring the balls of smooth movement. As a result, the movable body is smoothly movable with greater ease and is given a prolonged life.

The present invention will be described in greater detail with reference to the accompanying drawings.

DESCRIPTION OF THE PREFERRED EMBODIMENTS

Figure 1:
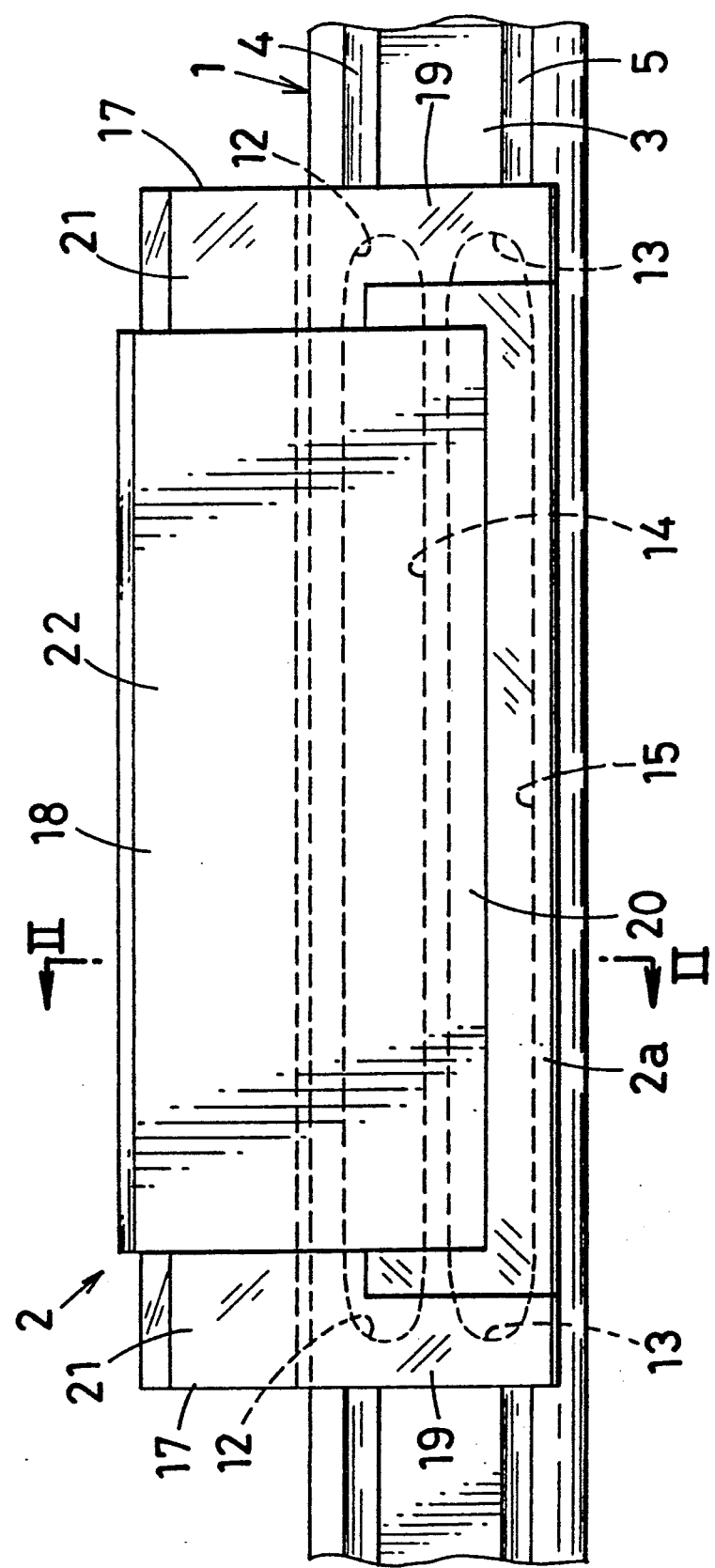
FIG. 1 is a side elevation showing a first embodiment of the invention, i.e., a linear guide device, as assembled.
Figure 2:
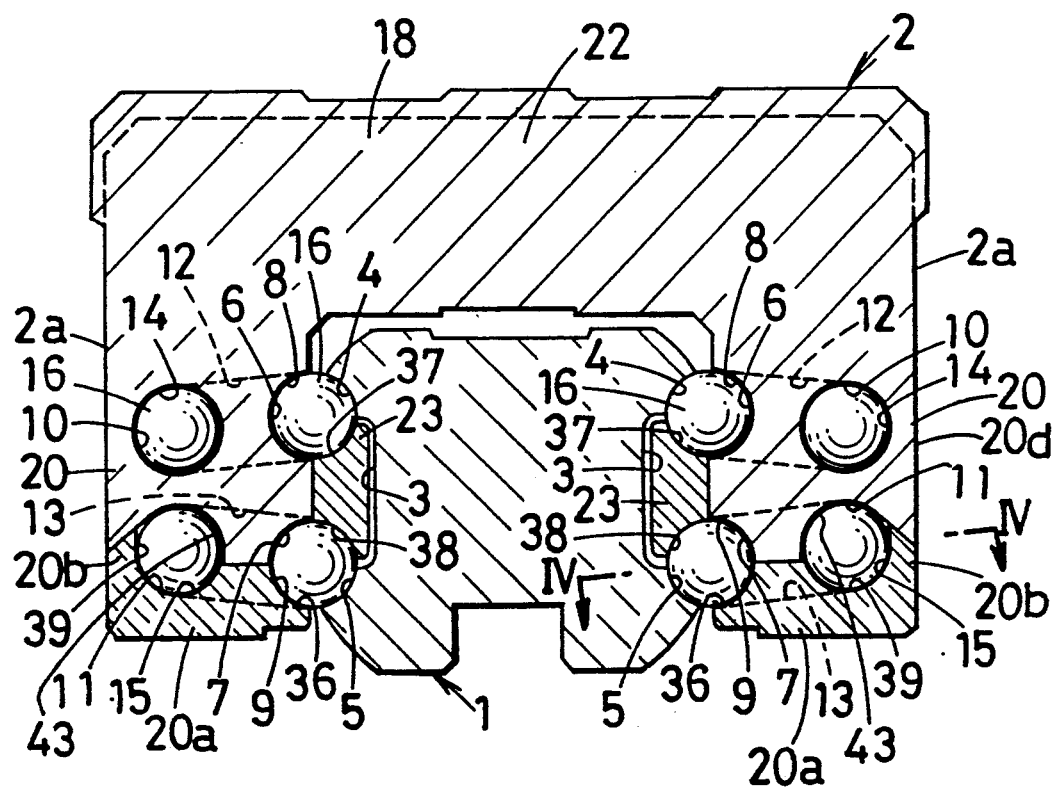
FIG. 2 is a view in section taken along the line II—II in FIG. 1.

FIGS. 1 to 10 show a first embodiment of linear guide device of the present invention.

With reference to FIGS. 1 to 5 showing the device as assembled, the device comprises a straight guide rail 1, and a movable body 2 approximately inverted U-shaped in cross section and movable as fitted over the guide rail 1.

The guide rail 1 is formed in each of its right and left side surfaces with a shallow groove 3 extending in the front-to-rear direction, i.e., longitudinally of the rail 1, and with circular-arc ball guide grooves 4, 5 positioned respectively above and below the groove 3 and having equal curvatures over the entire length thereof. A line A through the center of curvature of each guide groove 4 (5) in the guide rail 1 extends straight longitudinally of the rail 1 (see FIG. 5).

The movable body 2 has right and left opposed legs 2a. The surface of each leg 2a opposed to the side surface of the guide rail 1 is formed with upper and lower two circular-arc ball guide grooves 6, 7 opposed to the guide grooves 4, 5, respectively, and having equal curvatures over the entire length thereof. The guide groove 4 (5) of the guide rail 1 and the guide groove 6 (7) of the movable body 2 form a forward ball passage 8 (9). Each leg 2a of the movable body 2 is formed with upper and lower two borelike return ball passages 10, 11. Each end of the forward ball passage 8 (9) communicates with the corresponding end of the return ball passage 10 (11) through a reverse passage 12 (13) formed in each of the front and rear ends of the movable body 2 to provide an endless circulation ball channel 14 (15). The upper reverse passage 12 is inclined downward laterally outward. The lower reverse passage 13 is inclined upward laterally outward. A plurality of balls 16 are enclosed in each of the circulation ball channels 14, 15. The balls 16 are greater in curvature than the ball guide grooves 4, 5, 6, 7 of the guide rail 1 and the movable body 2. The balls 16 in the forward passage 8 (9) of each circulation channel 14 (15) are in contact with each of the faces defining the grooves 5 and 6 (5 and 7) at one point P or Q (see FIG. 3).

Figure 3:
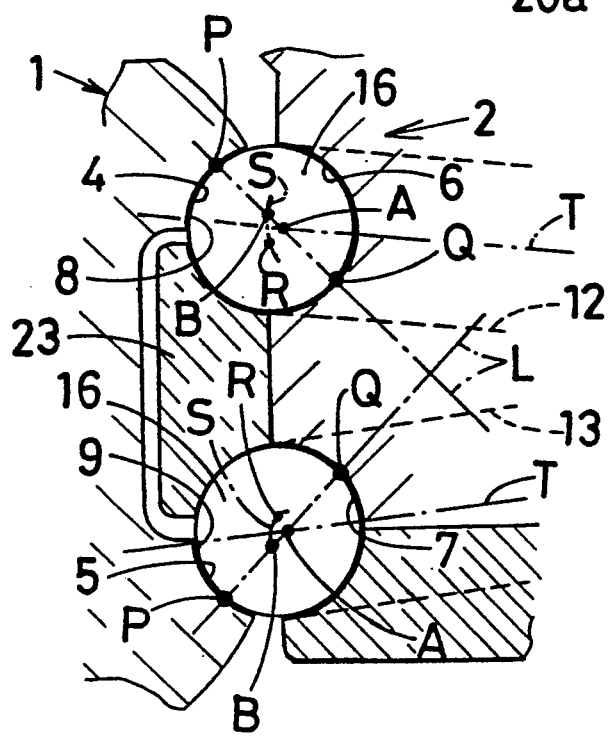
FIG. 3 is an enlarged fragmentary view of FIG. 2.

In cross section as seen in FIG. 3, a straight line L through the two points P, Q of the upper forward passage 8 inclines downward laterally outward, and a straight line L through the two points P, Q of the lower foward passage 9 inclines upward laterally outward. The two lines L intersect each other laterally outwardly of the forward passages 8, 9. In each circulation channel 14 (15), the forward passage 8 (9) is a loading zone, and the return passage 10 (11) and the reverse passage 12 (13) are nonloading zones.

Figure 4:
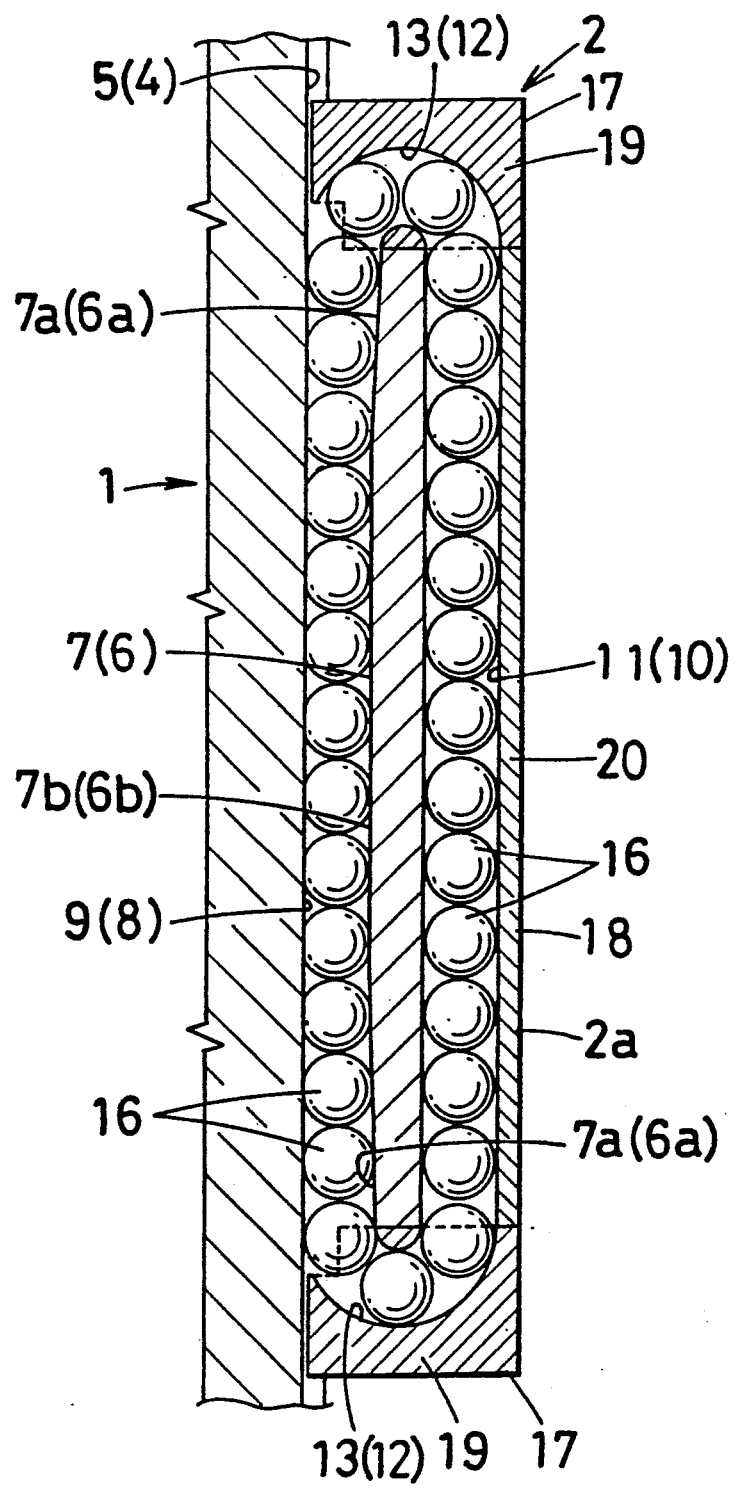
FIG. 4 is a view in section taken along the line IV—IV in FIG. 2.
Figure 5:
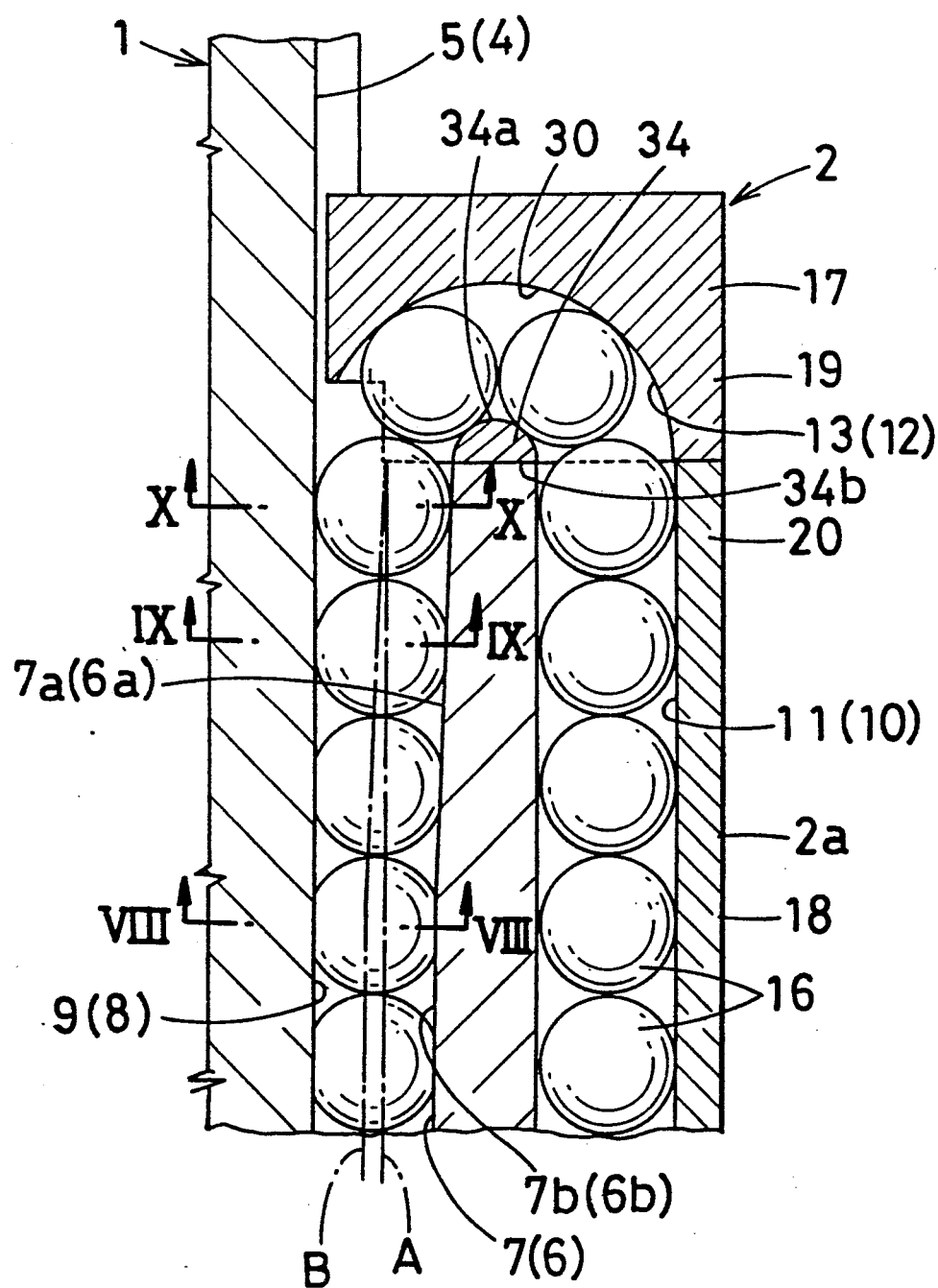
FIG. 5 is an enlarged fragmentary view of FIG. 4.

With reference to FIGS. 4 and 5, the ball guide groove 6 (7) of the movable body 2 has at each of its front and rear end portions a load reducing region 6a (7a) for gradually decreasing the load on the ball 16 toward the reverse passage 12 (13). In an intermediate portion 6b (7b) between the load reducing regions 6a (7a) at both ends, a line B through the center of curvature of the guide groove 6 (7) extends straight in parallel to a line A through the center of curvature of the guide groove 4 (5) of the guide rail 1 and is positioned closer to the guide rail 1 than the line A. Further in the load reducing regions 6a, 7a, the line B of the upper guide groove 6 and the line B of the lower guide groove 7 gradually approach the respective lines A through the centers of curvature of the guide grooves 4, 5 of the guide rail 1 so as to approach each other toward the respective reverse passages 12, 13. More specifically, the line B through the center of curvature of the load reducing region 7a of the movable body lower guide groove 7 shifts upward, when seen in cross section and as indicated by an arrow X in FIG. 8, on a continuous spiral curve S extending from the line B and extending through a point R away from the straight line L through the contact points P, Q at the end of the region 7a adjacent to the intermediate portion 7b, within a range closer to the guide rail 1 than the line A of the guide rail guide groove 5, and thus approaches the line A toward the reverse passage 13. The line B through the center of the load reducing region 6a of the upper guide groove 4 conversely shifts downward within a range closer to the guide rail 1 than the line A of the guide rail guide groove 4 and consequently gradually approaches the line A toward the reverse passage 12. At the other end of the region 6a or 7a adjacent to the reverse passage 12 or 13, each line B is positioned on a line T extending through the line A of the guide rail groove and in parallel to the reverse passage 12 or 13. The shifting direction mentioned above is not limitative; the line B approaches the line A when shifting in any direction insofar as the shift is within a circle centered about the line A and having a radius equal to the distance between the lines A and B in the intermediate portion 6b or 7b. In FIGS. 4 and 5, some portions of the upper circulation channel 14 are each indicated by a reference numeral following the reference numeral of the corresponding portion of the lower circulation channel 15 shown.

The movable body 2 as assembled comprises front and rear end caps 17 and an intermediate member 18. Each of the end caps 17 comprises right and left opposed legs 19, and a connecting portion 21 interconnecting the upper ends of the legs 19. Similarly, the intermediate member 18 comprises opposed legs 20 and a connecting portion 22.

The ball guide grooves 6, 7 are formed in the laterally inner side, opposed to the guide rail 1, of each leg 20 of the intermediate member 18 of the movable body 2. A retainer 23 is provided between the upper and lower grooves 6, 7. The borelike return passages 10, 11 are formed in the leg 20 outwardly of the grooves 6, 7.

Between the leg 19 of each end cap 17 and the end of the intermediate member 18 opposed thereto, the reverse passage 12 (13) is formed for interconnecting the ends of the forward passage 8 (9) and the return passage 10 (11).

Figure 6:
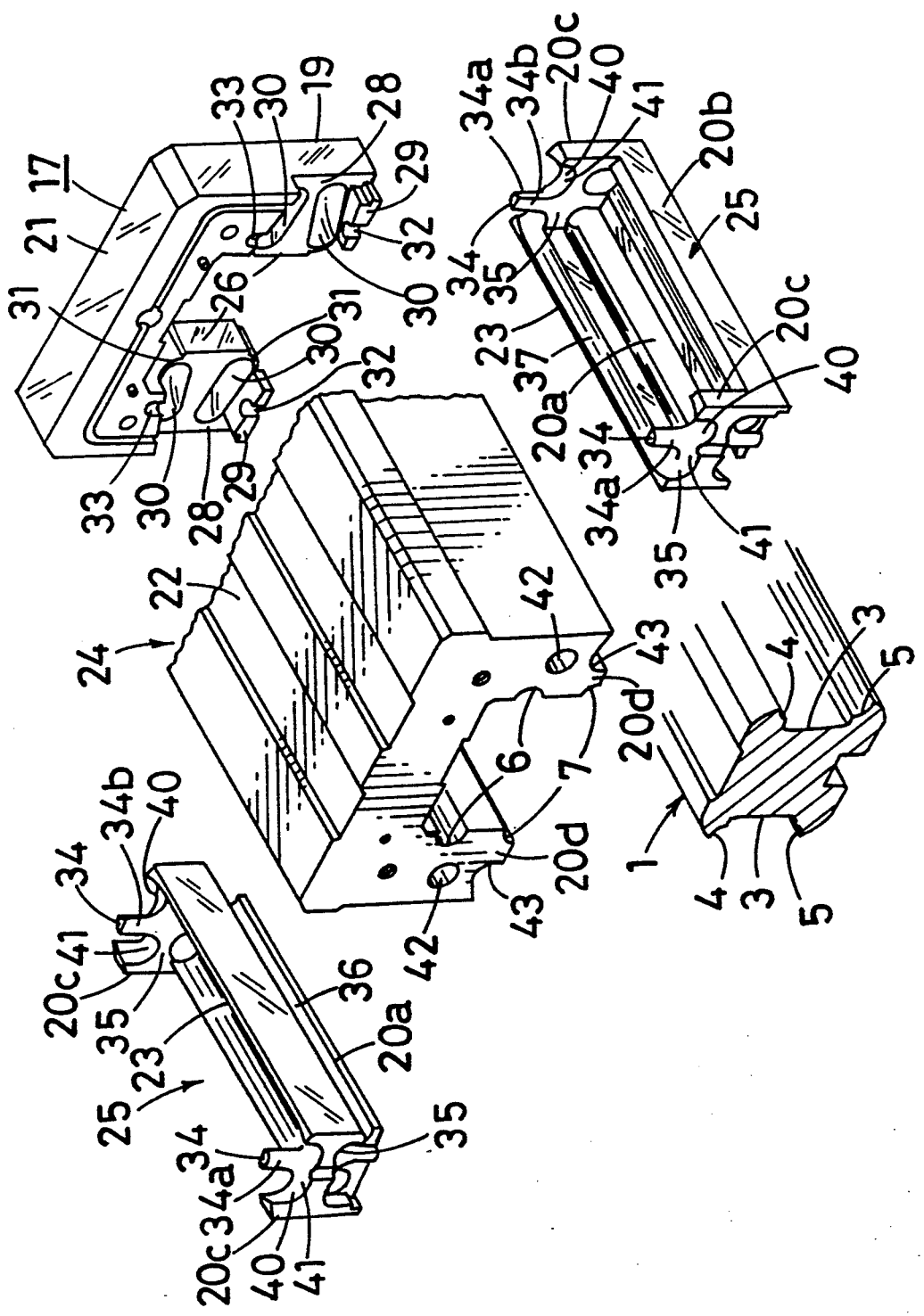
FIG. 6 is an exploded perspective view showing the linear guide device of first embodiment as partly omitted.

As seen in FIG. 6, the movable body 2 comprises the two end caps 17, a central main portion 24 and two cages 25 in combination.

Figure 7:
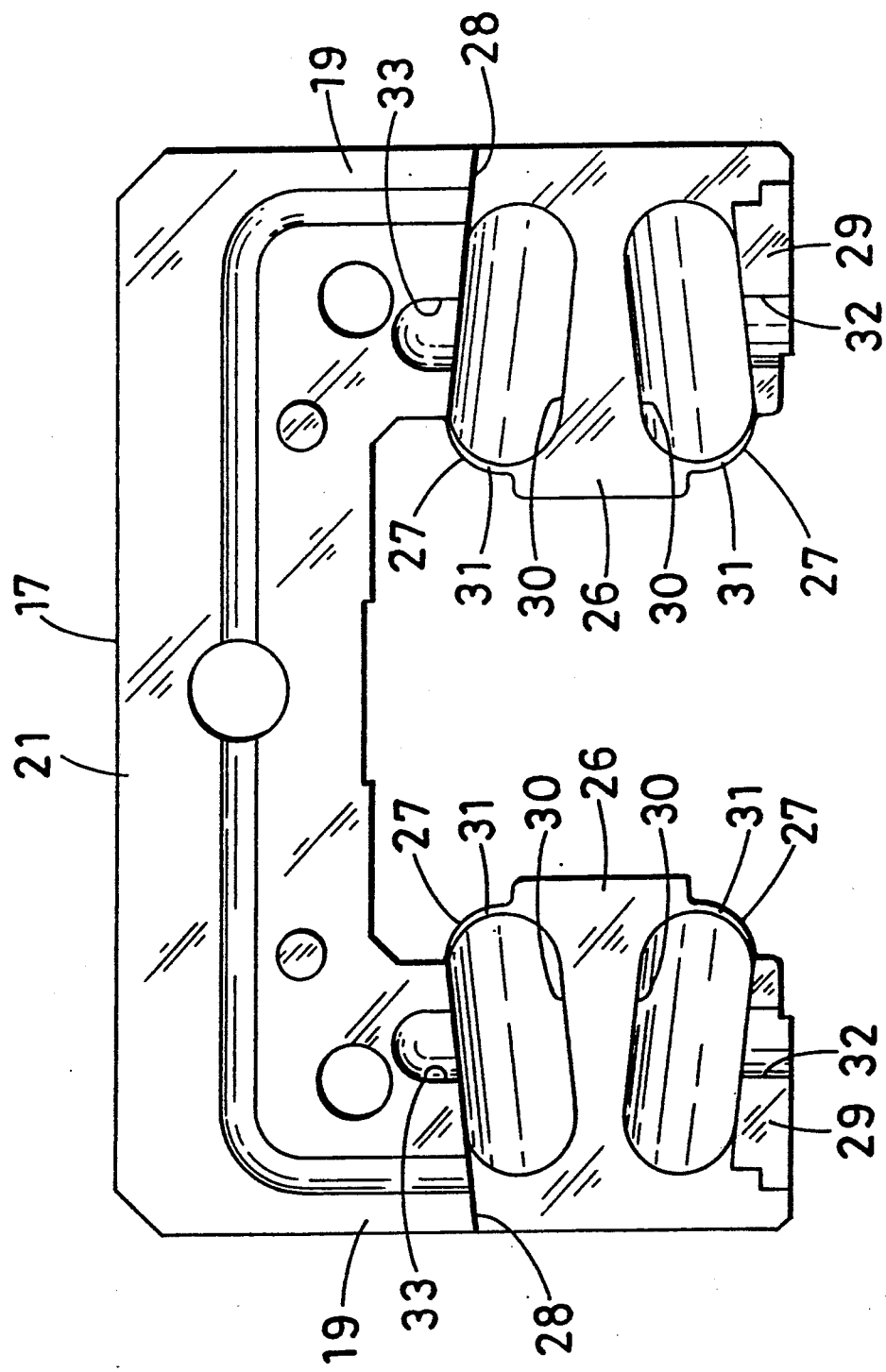
FIG. 7 is a view showing an end cap of the device as it is seen from the inner side thereof longitudinally of the device.

With reference to FIG. 7, each leg 19 of the end cap 17 is formed on the laterally inner surface thereof with a ridge 26 opposed to the groove 3 in the rail 1 and with circular-arc portions 27 positioned above and below the ridge 26 and corresponding to the respective guide grooves 4, 5. The inner surface, opposed to the main portion 24, of the end cap leg 19 has a groove 28 formed over the entire lateral width thereof including the ridge 26 and the circular-arc portions 27, and a projection 29 formed under the groove 28 and projecting inward. The upper and lower side walls defining the groove 28 are inclined to extend slightly away from each other laterally inward, partly forming the reverse passages 12, 13. The inner surface of the leg defining the bottom of the groove 28 is formed with upper and lower shallow recesses 30 in an elongated circular form. The laterally inner end of each recess 30 extends to the circular-arc portion 27 corresponding to the ball guide groove 6 or 7. Thus, the periphery of the circular-arc portion 27 defines this end of the recess 30 and serves as a scooping portion 31 for scooping the ball entering the reverse passage 12 or 13. The curvature of outer periphery of the scooping portion 31 corresponds to the curvature of the guide groove 6 or 7, and the inner periphery thereof defining the recess end corresponds to the ball 16 in curvature. The upper recess 30 inclines downward laterally outward, while the lower recess 30 inclindes upward laterally outward, so that the thickness of the scooping poriton 31 is greatest where it is adjacent to the ridge 26 and gradually decreases as it extends away therefrom. A cutout 32 in the form of a semicircular groove is formed in the inner face of the projection 29 at a laterally intermediate portion thereof. A cavity 33 in the form of a semicircular groove is formed in the inner surface of the end cap leg 19 above the groove 28 and has a lower end opposed to the groove 28.

Each cage 25 is an integral piece comprising a horizontal plate 20a forming the lower portion of the leg 20 of the intermediate member 18 of the movable body 2, a vertical plate 20b forming the portion of the leg 20 outward from the lower return passage 11, the retainer 23 and guide members 34 positioned at the respective ends of the cage and each in the form of a post of semicircular cross section.

The vertical plate 20b extends upward from the laterally outer edge of the horizontal plate 20a. Posts 20c are formed integrally with the front and rear ends of the vertical plate 20b. The retainer 23 is in the form of a vertical plate and has its front and rear ends integrally joined to the respective posts 20c by connecting portions 35. The retainer 23 is positioned above the laterally inner edge of horizontal plate 20a. The guide members 34 are integral with the respective front and rear ends of the horizontal plate 20a, extend upward and have lower portions projecting outward from the respective front and rear ends of the plate 20a. With respect to the lengthwise direction of the cage 25, the outer side of each guide member 34 has a cylindrical face 34a, and the inner side thereof has a flat face 34b. The guide member 34 is integral at a vertically intermediate portion thereof with the connecting portion 35. The flat face 34b of the guide member 34 is flush with the inner faces of the post 20c and the connecting portion 35. With respect to the lengthwise direction, the connecting portion 35 has a flat outer face which is positioned outward from the cylindrical face 34a of the guide member 34 and is flush with the outer face of the post 20c. The lower edge of the retainer 23 is spaced by a predetermined distance from the laterally inner edge of the horizontal plate 20a. The inner edge of the horizontal plate 20a has a ball guide face 36. The upper and lower edges of the retainer 23 also have ball guide faces 37, 38, respectively. The junction of the horizontal plate 20a and the vertical plate 20b also has a ball guide face 39. The upper and lower surfaces of the connecting portion 35 further provide ball guide faces 40. Around the lateral sides of each guide member 34 to the lengthwise outer side thereof at the upper and lower sides of the connecting portion 35, ball guide portions 41 partly providing the reverse passages 12, 13 are formed by the clindrical face 34a of the guide member 34, ball guide faces of the connecting portion 35, laterally inner face of the post 20c and laterally outer face of the retainer 23.

The central main portion 24 comprises the opposed legs 20 of the intermediate member 18 other than the cages 25, i.e., cores 20d, and the connecting portion 22 integral with the cores 20d. The length of the main portion 24 is slightly smaller than the distance between the flat faces 34b of the front and rear guide members 34 of the cage 25. The ball guide grooves 6, 7 are formed in the laterally inner surface of each core 20d. A bore 42 providing the upper return passage 6 extends through the core 20d and is positioned laterally outwardly of the upper groove 6 slightly therebelow. A groove 43 opened laterally and downwardly and providing the lower return passage 11 is formed in the core 20d and positioned laterally outwardly of and slightly above the lower groove 7.

The main portion 24 and the cages 25 are assembled with each core 20d of the main portion 24 fitted in a space defined by the vertical plate 20b, retainer 23, front and rear guide members 34 and connecting portion 35 of each cage 25. Consequently, the lower surface of the core 20d is in contact with the upper surface of the horizontal plate 20a between the guide members 34, and the front and rear ends are in contact with the flat faces 34b of the front and rear guide members 34 and the lengthwise inner flat faces of the connecting portions 35. Further the laterally outer portion of the core 30d fits in between the front and rear posts 20c, and the lower surface of the core portion extending laterally outward above the groove 43 is in intimate contact with the upper surface of the vertical plate 20b. The lower groove 43 of each core 20d and the guide face 39 at the junction of the horizontal plate 20a and the vertical plate 20b form the lower return passage 11. The laterally inner surface of the core 20d is in contact with the retainer 23.

In this state, the end caps 17 are attached to the opposite ends of the main portion 24 and the cages 25 in the following manner. The retainer 23, post 20c and connecting portion 35 of each cage 25 are fitted into the groove 28 in each end cap 17 to contact the post 20c and the lengthwise outer flat face of the connecting portion 35 with the bottom of the groove 28 in the end cap 17, whereby the end face of the connecting portion 21 of the end cap 17 is brought into contact with the end face of the main portion 24. At this time, the lower portion of each guide member 34 of the cage 25 fits in the cutout 32 in the projection 29 of the end cap 17, with the upper portion thereof fitting in the cavity 33 of the end cap 17. Each upper reverse passage 12 is formed by the upper ball guide portion 41 and the upper recess 30 of the end cap 17. Further each lower reverse passage 13 is formed by the lower ball guide portion 41 and the lower recess 30 of the end cap 17.

When the movable body 2 moves along the guide rail 1 longitudinally thereof, the balls 16 in the forward passage 8 (9) of each circulation channel 14 (15) roll along the guide grooves 4 and 6 (5 and 7) of the rail 1 and the movable body 2 rearwardly of the forward passage 8 (9) with respect to the direction of movement. Accordingly, the balls 16 in the forward passage 8 (9) successively enter the reverse passage 12 (13) positioned rearward with respect to the direction of movement, the balls 16 in the reverse passage 12 (13) successivley enter the return passage 10 (11), and the balls 16 in the return passage 10 (11) successively enter the forward passage 8 (9) through the reverse passage 12 (13) positioned forward with respect to the direction of movement. In this way, the balls 16 circulate through the circulation channel 14 (15).

Figure 8:
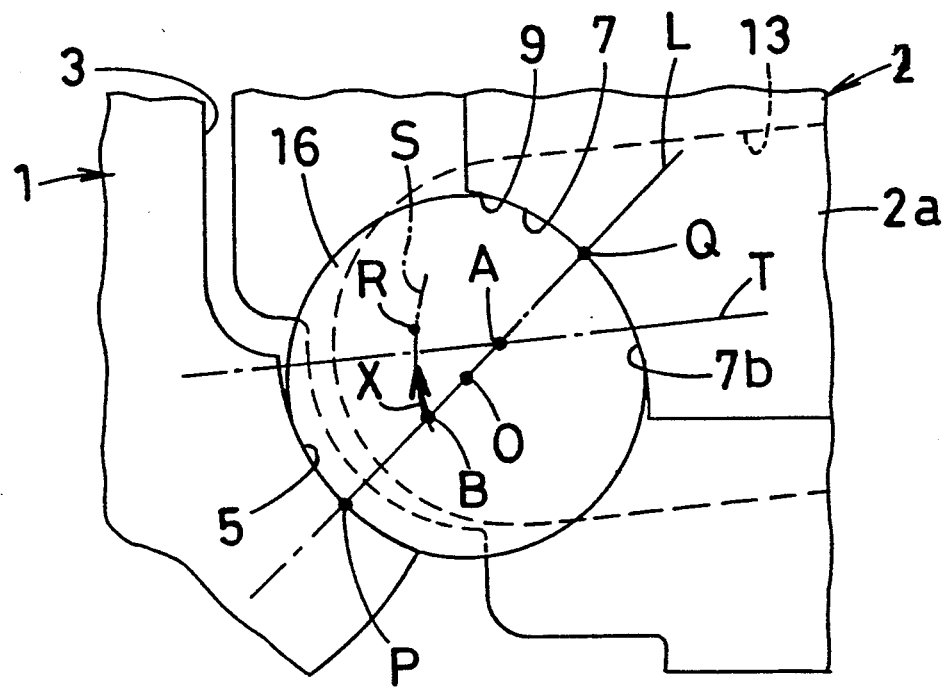
FIG. 8 is an enlarged view in section taken along the line VIII—VIII in FIG. 5.

Now, the travel of the ball 16 from the forward passages 8, 9 into the reverse passages 12, 13 will be described with reference to the right lower forward passage 9. When seen in cross section as shown in FIG. 8, the distance between the line B through the center of curvature of the intermediate portion 7b of the movable body guide groove 7 and the line A through the center of curvature of the guide rail guide groove 5 is greatest on the straight line L through the points P, Q of contact of the ball 16 with the faces defining the grooves 5, 7. In other words, the distance between the contact points P, Q is smalllest. In this state, the center O of the ball 16 is positioned at the midpoint between the lines A and B on the straight line L. Consequently, the ball 16 is subjected to a great load and elastically brought close to the grooved faces 5, 7 by being loaded.

Figure 9:
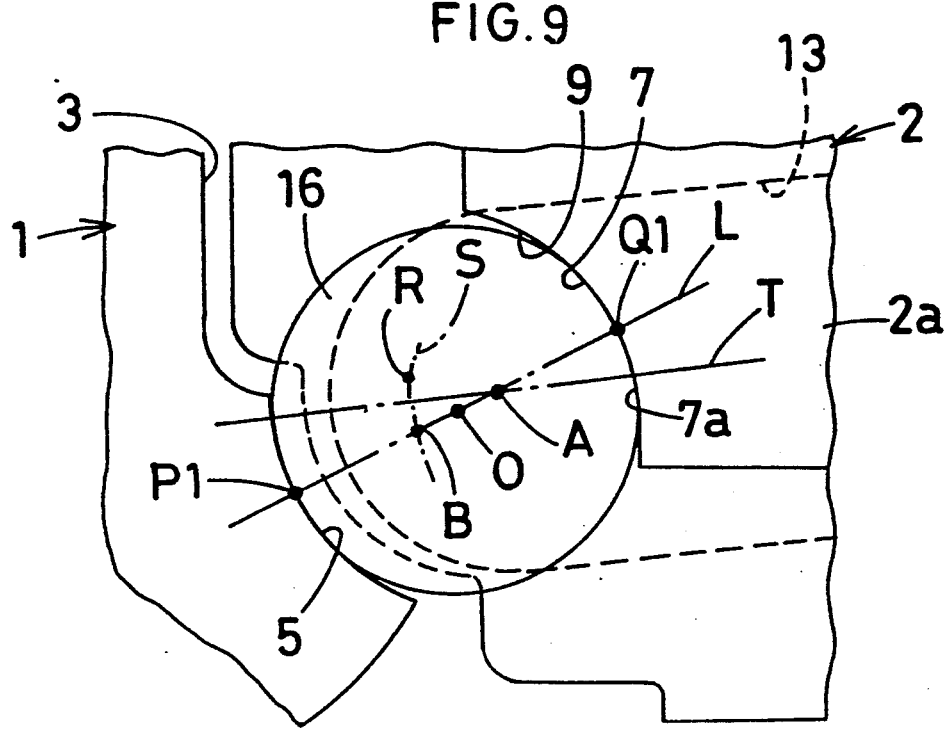
FIG. 9 is an enlarged view in section taken along the line IX—IX in FIG. 5.

When the ball 16 enters the load reducing region 7a, the line B of the movable body 2 approaches the line A of the guide rail 1 on the curve S as shown in FIG. 9, and the distance between the two lines A and B becomes smaller than in FIG. 8. The points of contact of the ball 16 with the grooved faces 5, 7 shift to P1, Q1. As a result, the distance between the contact points P1, Q1 becomes slightly greater than the distance between the contact points P, Q, and the ball 16 is subjected to a smaller load and elastically brought less close to the grooved faces 5, 7.

Figure 10:
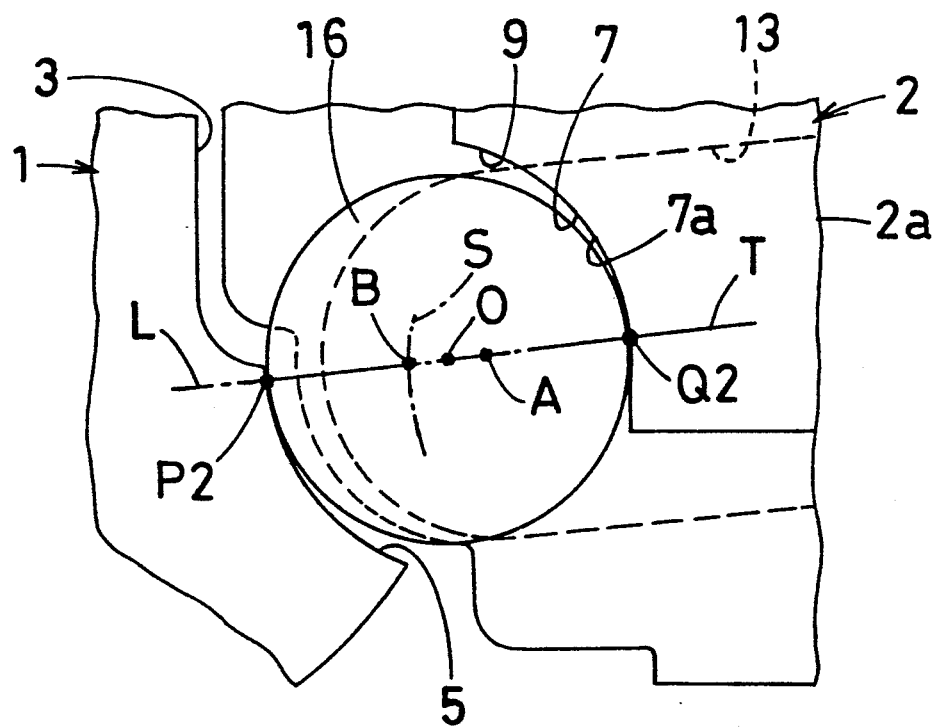
FIG. 10 is an enlarged view in section taken along the line X—X in FIG. 5.

When the ball 16 reaches the end of the load reducing region 7a adjacent to the reverse passage 13, the line B of the movable body 2 further approaches the line A of the guide rail 1 on the curve S as shown in FIG. 10, and the distance between the lines A and B becomes smaller than in FIG. 9. The points of contact of the ball 16 with the grooved faces 5, 7 shift to P2, Q2. In cross section, the line L through the contact points P2, Q2 extends through the line A and is in alignment with a line T parallel to the reverse passage 13. Consequently, the distance between the contact points P2, Q2 becomes greater than the distance between the contact points P1, Q1, and the ball 16 is subjected to a further smaller load and elastically brought still less close to the grooved faces 5, 7. The direction of the load acting on the ball 16 is initially so inclined in the intermediate portion 7b that the right side is above a horizontal line, whereas the direction gradually rotates rightward toward the reverse passage 13 when seen in cross section and eventually becomes parallel to the reverse passage.

In this state, the ball 16 enters the reverse passage 13 which is a nonloading zone. While the ball 16 thus travels from the intermediate portion 7b through the load reducing region 7a into the reverse passage 13, the load on the ball 16 gradually decreases. This prevents the displacement of the movable body 2 when the balls 2 move from the loading zone into the nonloading zone, permitting the movable body to advance straight properly.

Further in the load reducing region 7a, the points of contact of the ball with the grooved faces 5, 7 of the guide rail 1 and the movable body 2 gradually shift from P,Q to P1, Q1 and then to P2, Q2, with the direction through the contact points P, Q also altering gradually, with the result that the balls 16 are preloaded in varying directions. Accordingly, when the ball 16 is loaded in the maximum loading region in a direction other than the direction of the straight line through the contact points P, Q, vibration can be inhibited.

Moreover, the ball 16 in the forward passage is preloaded in a direction toward the reverse passage 12 or 13 immediately before entering the reverse passage 12 or 13. This permits the ball to enter the reverse passage smoothly.

Furthermore when the lines A, B through the centers of the guide rail and movable body guide grooves 5, 7 shift to approach in the load reducing region 7a as stated above, the ball 16 comes into contact with the thick part of the ball scooping portion 31 at the laterally inner end of the lower recess 30 of the movable body end cap 17, i.e., the part thereof adjacent to the ridge 26, whereby the thin part of the scooping portion 31 away from the ridge 26 can be prevented from breaking.

When the balls 16 move from the reverse passage 13 into the forward passage 9, the load on the balls 16 conversely increases gradually. This similarly prevents the displacement of the movable body 2 when the balls move from the nonloading zone into the loading zone, eliminating the likelihood of impairing the straight advancing movement of the movable body. Additionally, the balls 16 are movable from the reverse passage 13 into the forward passage 9 smoothly.

When the balls 16 in the other circulation ball channels 14, 15 move from the forward passages 8, 9 thereof into the resepctive reverse passages 12, 13 and vice versa, the presence of the load reducing regions 6a, 7a results in the same advantages as described above.

Figure 11:
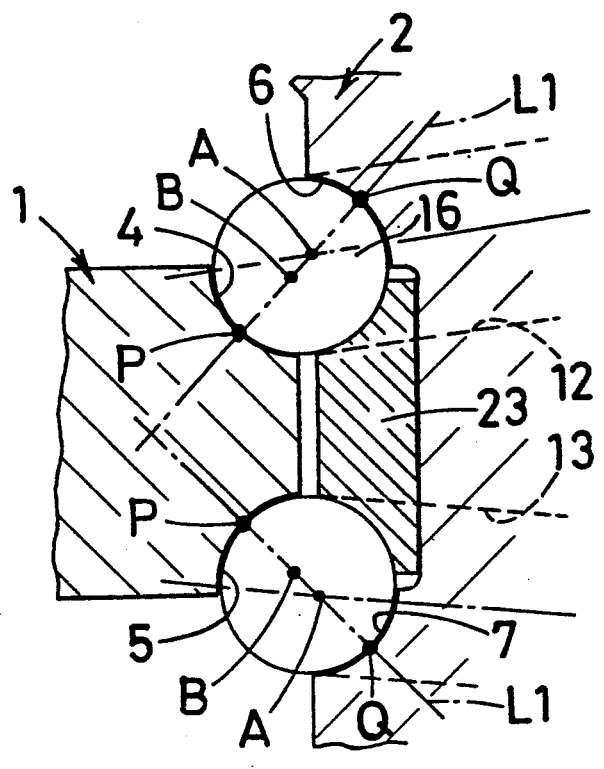
FIG. 11 is a view corresponding to FIG. 3 and showing a second embodiment of the invention.

FIG. 11 shows a second embodiment of linear guide device of the invention. With reference to FIG. 11, at each side of the guide rail 1, a line L1 through the points P, Q of contact of the ball 16 with the guide grooved faces 4, 6 forming the forward ball passage 8 of the circulation ball channel 14 intersects a line L1 through the points P, Q of contact of the ball 16 with the guide grooved faces 5, 7 forming the forward ball passage 9 of the circulation channel 15 laterally inwardly of the forward passages 8, 9. In the load reducing regions 6a, 7a, the line B through the center of the upper guide groove 6 of the movable body 2 and the line B through the center of the lower guide groove 7 of the body 2 gradually approach the respective lines A of the guide rail guide grooves 4, 5 so as to shift away from each other in opposite direction to the corresponding lines B already described with reference FIGS. 8 to 10.

The second embodiment operates in the same manner as the first with the same advantages.

Figure 12:
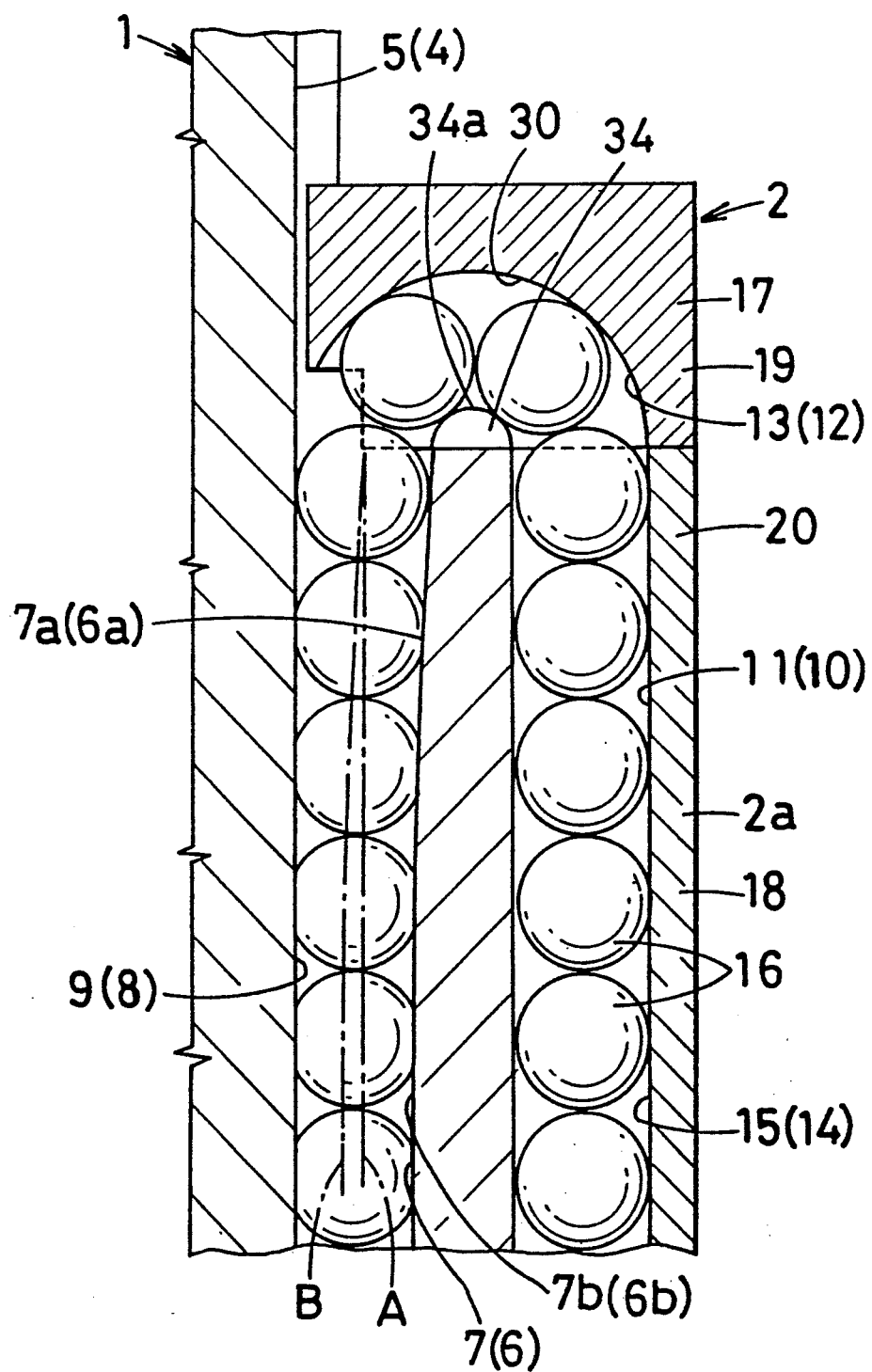
FIG. 12 is a view corresponding to FIG. 5 and showing a third embodiment of the invention.

FIG. 12 shows a third embodiment of linear guide device of the present invention. With reference to FIG. 12, the line B through the center of curvature of the circular-arc ball guide groove 6 (7) of the movable body 2 is remotest from the line A through the center of curvature of the ball guide groove 4 (5) of the guide rail 1 in the lengthwise midportion of the movable body 2, and gradually approaches the line A toward the lengthwise opposite ends of the body 2. Thus, the line B is in the form of a circular arc of small curvature. Accordingly, the distance between the points P, Q of contact of the ball 16 with the guide grooved faces 4, 6 (5, 7) is smallest at the midportion and gradually increases toward the opposite ends, so that the preload on the balls 16 in the forward passage 8 (9) is greatest at the midportion and gradually decreases toward the ends. The line B approaches the line A in the same manner as in the first embodiment. In an intermediate portion of the movable body 2 other than the front and rear end portions thereof having a predetermined length, the line B may gradually approach the line A through the center of curvature of the guide rail guide groove 4 (5) on the straight line L through the points P, Q of contact of the ball 16 with the guide grooved faces 4, 6 (5, 7).

In this state, the ball 16 at the lengthwise midportion of the ball foward passage 8 (9) is given a usual preload. If a moment about a vertical axis or about a lateral axis then acts on the movable body 2, the load on the other balls 16 increases but will not be greater than the preload applied to the ball 16 at the midportion.

The third embodiment operates in the same manner as the first with the exception of the above feature.

What is claimed is:

1. A linear guide device comprising a straight guide rail, and a movable body having an approximately inverted U-shaped cross section and movable as fitted over the guide rail, each of opposite side surfaces of the guide rail and a surface of each of opposite legs of the movable body which surface is opposed to the rail side surface being each formed with a ball guide groove having a circular-arc portion, the ball guide grooves being equal in the curvature of the circular-arc portion over the entire length thereof, the ball guide grooves providing a forward ball passage, each of opposite legs of the movable body being formed with a return ball passage, each end of the forward ball passage being in communication with the corresponding end of the return ball passage through a reverse passage fromed in each end of the movable body to form a circulation ball channel, a plurality of balls being enclosed in the circulation ball channel and rollable between the movable body and the guide rail, the balls being in point contact with the circular-arc portions of the ball guide grooves when in the forward ball passage of the circulation ball channel, the ball guide groove of the movable body having at each end thereof a load reducing region gradually decreasing the load on the ball toward the reverse passage, a line through the center of curvature of the circular-arc portion of the movable body ball guide groove to be in point contact with the ball in the load reducing region being shifted, when seen in cross section, on a line extending from said line and extending through a point away from a straight line through the points of contact of the ball with the circular-arc portions of the ball guide grooves in a maximum loading region, within a range closer to the guide rail than a line through the center of curvature of the circular-arc portion of the guide rail ball guide groove to be in point contact with the ball, and being thereby made to gradually approach the line of the guide rail through the center toward the reverse passage.

2. A linear guide device as defined in claim 1 wherein the line extending from said line of the movable body through the center and extending through the point away from the straight line through the points of contact in the maximum loading region is a continuous curve.

3. A linear guide device as defined in claim 1 wherein when seen in cross section, said line through the center of the movable body guide groove in the load reducing region shifts toward a line extending through the line through the center of the guide rail guide groove and in parallel to the reverse passage.

4. A linear guide device as defined in claim 1 wherein said line of the movable body through the center is most remote from the line through the center of the guide rail guide groove in the lengthwise middle portion of the movable body and approaches the line of the guide rail guide groove toward the lengthwise opposite ends of the movable body.

5. A linear guide device as defined in claim 1 wherein the circulation ball channel is provided at each of upper and lower two levels on each of the right and left sides of the guide rail, and the line through the points of contact of the ball with the guide groove circular-arc portions forming the forward ball passage of one of the circulation channels intersects the corresponding line of the other circulation channel laterally outwardly of the forward passages of the channels, the lines through the centers of curvature of the two movable body ball guide grooves in the load reducing regions shifting in directions toward each other.

6. A linear guide device as defined in claim 1 wherein the circulation ball channel is provided at each of upper and lower two levels on each of the right and left sides of the guide rail, and the line through the points of contact of the ball with the guide groove circular-arc portions forming the forward ball passage of one of the circulation channels intersects the corresponding line of the other circulation channel laterally inwardly of the forward passages of the channels, the lines through the centers of curvature of the two movable body ball guide grooves in the load reducing regions shifting in directions away from each other.

* * * * *